United States Patent
Gao et al.

(10) Patent No.: US 12,195,826 B2
(45) Date of Patent: Jan. 14, 2025

(54) MIXED RARE EARTH CONCENTRATE MINERAL AND SUSPENDED MINERAL PHASE TRANSFORMATION-CLEAN LEACHING SYSTEM AND METHOD THEREOF

(71) Applicant: Northeastern University, Shenyang (CN)

(72) Inventors: Peng Gao, Shenyang (CN); Shuai Yuan, Shenyang (CN); Jilai Ning, Shenyang (CN); Yuexin Han, Shenyang (CN); Yanjun Li, Shenyang (CN); Yongsheng Sun, Shenyang (CN); Wenbo Li, Shenyang (CN)

(73) Assignee: NORTHEASTERN UNIVERSITY, Shenyang (CN)

( * ) Notice: Subject to any disclaimer, the term of this patent is extended or adjusted under 35 U.S.C. 154(b) by 0 days.

(21) Appl. No.: 18/559,248

(22) PCT Filed: Sep. 8, 2023

(86) PCT No.: PCT/CN2023/117725
§ 371 (c)(1),
(2) Date: Nov. 6, 2023

(87) PCT Pub. No.: WO2024/093526
PCT Pub. Date: May 10, 2024

(65) Prior Publication Data
US 2024/0279773 A1 Aug. 22, 2024

(30) Foreign Application Priority Data
Nov. 3, 2022 (CN) .......................... 202211367895.3

(51) Int. Cl.
*C22B 59/00* (2006.01)
*C22B 1/02* (2006.01)
(Continued)

(52) U.S. Cl.
CPC ................ *C22B 59/00* (2013.01); *C22B 1/02* (2013.01); *C22B 3/10* (2013.01); *C22B 3/12* (2013.01)

(58) Field of Classification Search
None
See application file for complete search history.

(56) References Cited

U.S. PATENT DOCUMENTS

| | | |
|---|---|---|
| 2015/0329940 A1 | 11/2015 | Teixeira et al. |
| 2017/0356067 A1 | 12/2017 | Peterson et al. |
| 2021/0310100 A1 | 10/2021 | Huang et al. |

FOREIGN PATENT DOCUMENTS

| | | |
|---|---|---|
| CN | 102206763 A | 10/2011 |
| CN | 102212674 A | 10/2011 |

(Continued)

OTHER PUBLICATIONS

English translation of CN 111500852 B (originally published Aug. 7, 2020), obtained from PE2E search.*

*Primary Examiner* — George Wyszomierski
(74) *Attorney, Agent, or Firm* — MUNCY, GEISSLER, OLDS & LOWE, P.C.

(57) ABSTRACT

A mixed rare earth concentrate mineral and suspended mineral phase transformation-clean leaching system and a method thereof achieve low-temperature phasing transformation of a rare earth mineral. The system includes a Venturi dryer, a multi-stage separator, a suspension preheating decomposition furnace, a multi-state fluidization sealing valve, a mineral phase transformation machine, a ball mill, a multi-stage acid leaching tank, an alkali leaching tank and a neutralization tank. The method includes: after preheating mixed rare earth concentrate mineral powder, placing the preheated mixed rare earth concentrate mineral powder in a suspension preheating decomposition furnace for preheating decomposition to enable the powder to be in the suspension state, after cyclone separation, introducing the powder to a mineral phase transformation machine for mineral phase transformation, after ball milling, performing acid washing, performing alkali decomposition on acid leached residues, performing acid leaching twice on acid liquor, and neutralizing leached products to obtain neutralization residues.

7 Claims, 3 Drawing Sheets

(51) Int. Cl.
*C22B 3/10* (2006.01)
*C22B 3/12* (2006.01)

(56) References Cited

FOREIGN PATENT DOCUMENTS

| | | | |
|---|---|---|---|
| CN | 102277483 | A | 12/2011 |
| CN | 105154662 | A | 12/2015 |
| CN | 105543509 | A | 5/2016 |
| CN | 106065432 | A | 11/2016 |
| CN | 108548418 | A | 9/2018 |
| CN | 109136590 | A | 1/2019 |
| CN | 111500852 | A | 8/2020 |
| CN | 111500853 | A | 8/2020 |
| CN | 111500854 | A | 8/2020 |
| CN | 111876616 | A | 11/2020 |
| CN | 111926181 | A | 11/2020 |
| CN | 112410588 | A | 2/2021 |
| CN | 113834338 | A | 12/2021 |
| CN | 115637340 | A | 1/2023 |
| WO | WO-2021/237830 | A1 * | 12/2021 |

* cited by examiner

MIXED RARE EARTH CONCENTRATE MINERAL AND SUSPENDED MINERAL PHASE TRANSFORMATION-CLEAN LEACHING SYSTEM AND METHOD THEREOF

BACKGROUND OF THE INVENTION

1. Field of the Invention

The invention relates to the field of metallurgical processing and comprehensive resource recovery, in particular to a mixed rare earth concentrate mineral and suspended mineral phase transformation-clean leaching system and a method thereof.

2. The Prior Arts

The Bayan Obo mixed type rare earth ore is a rare earth mineral with iron-rare earth-niobium coexistence, unique to the Bayan Obo area in Inner Mongolia, China. The main rare earth components are bastnaesite and monazite. It has the characteristics of large reserves, complex types of accompanying ores, high rare earth content, etc. Due to the close symbiotic relationship between the rare earth mineral and a large amount of hematite and limonite, as well as their accompanying relationship and similar ore dressing properties, it is difficult to obtain high-grade rare earth concentrates by conventional ore dressing methods.

At present, a main method for processing Bayan Obo mixed type rare earth ore is a concentrated sulfuric acid roasting process, which has the advantages of being low in requirements for rare earth feeding grade, relatively simple in process, short in operation flow, and favorable for large-scale production; but the method has obvious main defects: wastewater, waste gas, and solid waste pollute the surrounding environment, and thorium pyrophosphate produced by high-temperature roasting is difficult to recycle and must be sealed up for safekeeping, which not only occupies a large amount of land, but also brings hidden dangers to the surrounding environment; and another method for processing the Bayan Obo mixed type rare earth ore is an alkali decomposition method. Compared to a concentrated sulfuric acid decomposition method, the alkali decomposition method is cleaner in production manner and higher in comprehensive resource recovery efficiency, but also has problems of being high in requirements for concentrate grade, discontinuous in operation flow, low in leaching efficiency, high in alkali consumption, severe in equipment corrosion, etc., and is difficult in industrial application.

Patent CN111926181A discloses a method for distributing and recovering valuable components in a rare earth concentrate. Mixed rare earth concentrate mineral is roasted with fluidizing air and then is subjected to preferential dissolution by hydrochloric acid to obtain a rare earth chloride solution containing less cerium and a thorium-containing cerium-enriched residue. After the cerium-enriched residue is decomposed with alkaline liquor, F, P, cerium and thorium are further recovered. The method achieves comprehensive recovery of valuable elements in the mixed rare earth concentrate mineral, but after oxidation roasting of bastnaesite, $Ce^{4+}$ will be reduced by $Cl^-$ to $Ce^{3+}$ and generate chlorine gas in the hydrochloric acid leaching process, which requires the addition of additional reducing agents for elimination; and in the leaching process, part of F and $Ce^{4+}$ will be dispersed in a leaching liquor as a complex, which increases the difficulty of the extraction and separation process and reduces economic benefits.

Patent CN109136590A discloses a Baotou mixed type rare earth concentrate decomposition treatment process, which uses a dilute hydrochloric acid graded countercurrent preferential solution leaching method to treat the mixed rare earth concentrate mineral after oxidation roasting, obtaining a low acidity chloride rare earth solution containing less cerium and a hydrochloric acid preferential leaching residue, avoiding the coordination leaching of $Ce^{4+}$ and F in the hydrochloric acid leaching process of the bastnaesite after oxidation roasting; and however, the process has the defects such as complex leaching processes and low leaching rates.

SUMMARY OF THE INVENTION

In response to the problems existing in the prior art, the invention provides a mixed rare earth concentrate mineral and suspended mineral phase transformation-clean leaching system and a method thereof, which can achieve low-temperature phasing transformation of a rare earth mineral, avoid generation of cerium tetravalent in mineral phase transformation products, increase the leaching rate of rare earth, and also prevent generation of fluorine waste gas and chlorine waste gas.

The mixed rare earth concentrate mineral and suspended mineral phase transformation-clean leaching system disclosed by the invention comprises:

a feed hopper, a Venturi dryer, a first cyclone separator, a second cyclone separator, a suspension preheating decomposition furnace, a third cyclone separator, a first fluidization sealing valve, a mineral phase transformation machine, a second fluidization sealing valve, a fifth cyclone separator, a water cooling tank, a ball mill, a first acid leaching tank, an alkali leaching tank, a water washing tank, a second acid leaching tank and a neutralization tank;

wherein the feed hopper communicates with the Venturi dryer, a top discharge opening of the Venturi dryer communicates with a feed opening of the first cyclone separator through a pipeline, a bottom discharge opening of the first cyclone separator communicates with the second cyclone separator, a bottom discharge opening of the second cyclone separator communicates with the suspension preheating decomposition furnace, a top discharge opening of the suspension preheating decomposition furnace communicates with a feed opening of the third cyclone separator through a pipeline, and a bottom discharge opening of the third cyclone separator communicates with the first fluidization sealing valve; the first fluidization sealing valve communicates with the mineral phase transformation machine, a discharge opening of the mineral phase transformation machine communicates with the second fluidization sealing valve, a discharge opening of the second fluidization sealing valve communicates with a feed opening of the fifth cyclone separator, a bottom discharge opening of the fifth cyclone separator communicates with the water cooling tank, the water cooling tank communicates with the ball mill, a discharge opening of the ball mill communicates with a feed opening of the first acid leaching tank, a discharge opening of the first acid leaching tank communicates with the alkali leaching tank, the alkali leaching tank communicates with the water washing tank, the water washing tank communicates with the second acid leaching tank, and the second acid leaching tank communicates with the neutralization tank.

The system further comprises a screw feeder and a feed belt, wherein a discharge opening of the feed hopper communicates with a feed opening of the screw feeder, a discharge opening of the screw feeder communicates with the feed belt, and a discharge end of the feed belt communicates with a feed opening of the Venturi dryer.

In the system, a main burner is arranged at a bottom of the suspension preheating decomposition furnace, and communicates with a reducing gas source and an air source through a pipeline. $H_2$ and/or CO are/is selected as a reducing gas.

In the system, a top of the first cyclone separator communicates with an electric dust remover through a pipeline, the electric dust remover communicates with a tail gas absorption station, the tail gas absorption station communicates with a draught fan, and the draught fan communicates with a chimney through a pipeline.

In the system, a discharge opening of the electric dust remover communicates with a feed opening of a pneumatic lifting pump, the pneumatic lifting pump communicates with an ash returning fan, and a discharge opening of the pneumatic lifting pump communicates with the third cyclone separator through a pipeline.

In the system, a sixth cyclone separator is also arranged, a bottom discharge opening of the fifth cyclone separator communicates with the sixth cyclone separator through a pipeline on which a second ash hopper is arranged, a top discharge opening of the sixth cyclone separator communicates with the fifth cyclone separator through a pipeline, a top discharge opening of the fifth cyclone separator communicates with the third cyclone separator through a pipeline, a top discharge opening of the third cyclone separator communicates with the second cyclone separator through a pipeline, and a top discharge opening of the second cyclone separator communicates with the Venturi dryer through a pipeline on which a drying heat generator and a first ash hopper are mounted, wherein the drying heat generator communicates with a reducing gas source through a pipeline, and $H_2$ and/or CO are/is selected as the reducing gas source.

In the system, air inlets are formed in bottoms of the first fluidization sealing valve and the second fluidization sealing valve to communicate with a nitrogen gas source pipeline.

In the system, an air inlet is formed in a bottom of the mineral phase transformation machine and communicates with a nitrogen gas source pipeline, an air exchange opening is formed in a top of the mineral phase transformation machine and communicates with a fourth cyclone separator; and a bottom discharge opening of the fourth cyclone separator communicates with the mineral phase transformation machine, and a top discharge opening of the fourth cyclone separator communicates with the suspension preheating decomposition furnace.

The main effect of the mineral phase transformation machine is to provide a fluidization reducing room for mineral powder so as to realize high-efficiency mineral phase transformation. A main body of the mineral phase transformation machine comprises a mineral phase transformation machine housing which forms a reducing room, a mineral phase transformation feed opening and a mineral phase transformation discharge opening are formed in the housing, a plurality of top baffles are arranged on an inner side of an upper part of the housing, a plurality of second bottom baffles are arranged on an inner side of a lower part of the housing, a first bottom baffle is arranged just below each top baffle, a gap is reserved between each first bottom baffle and each top baffle, the top baffles, the first bottom baffles and the second bottom baffles jointly form a mineral powder flow passage, and a space formed between each top baffle and each second bottom baffle is a vertical passage; a mineral phase transformation air distributor is arranged on one side where the first bottom baffles and the second bottom baffles are arranged, of the housing, for evenly distributing airflow; and a mineral phase transformation air inlet is formed in each vertical passage for providing a sufficient amount of aeration air and fluidization air to result in stable flowing of mineral powder.

The main effect of the first fluidization sealing valve and the second fluidization sealing valve is to isolate gas which is introduced along with the mineral powder in the previous stage. A main body of each of the first fluidization sealing valve and the second fluidization sealing valve comprises a fluidization sealing housing which forms a fluidization room, a top fluidization sealing baffle is arranged at a top of the fluidization room, a bottom fluidization sealing baffle is arranged just below the top fluidization sealing baffle, and a fluidization sealing air distributor is arranged on one side of the bottom fluidization sealing baffle for evenly distributing airflow; and a nitrogen gas inlet is formed in each vertical passage for providing a sufficient amount of aeration air and fluidization air to result in stable flowing of mineral powder.

In the system, a discharge opening of the ball mill communicates with a feed opening of a screw classifier, an overflow opening of the screw classifier communicates with a feed opening of the first acid leaching tank through a pipeline, and a sand returning opening of the screw classifier communicates with the ball mill.

In the system, a liquid drain opening of the first acid leaching tank communicates with the second acid leaching tank through a pipeline.

The system further comprises a first pressure filter, a discharge opening of the first acid leaching tank communicates with the first pressure filter, a discharge opening of the first pressure filter communicates with the alkali leaching tank, and a liquid drain opening below the first pressure filter communicates with the second acid leaching tank through a pipeline.

In the system, the alkali leaching tank communicates with the water washing tank, and a liquid drain opening of the water washing tank communicates with a washing liquor recovery tank through a pipeline.

The system further comprises a second pressure filter, a discharge opening of the water washing tank communicates with a feed opening of the second pressure filter, a discharge opening of the second pressure filter communicates with the second acid leaching tank, and a liquid drain opening below the second pressure filter communicates with the washing liquor recovery tank through a pipeline.

In the system, the second acid leaching tank communicates with the neutralization tank, a liquid drain opening of the neutralization tank communicates with a chlorination rare earth product tank; and a discharge opening of the neutralization tank communicates with a thorium residue containing pond.

In the system, the first acid leaching tank, the alkali leaching tank, the water washing tank, the second acid leaching tank, and the neutralization tank are all independently provided with pH online monitoring devices and temperature control devices.

In the system, the suspension preheating decomposition furnace, the mineral phase transformation machine, and the electric dust remover are all independently provided with temperature measuring devices for monitoring the operating temperature, and pressure sensing devices for monitoring pressure.

A method of using the mixed rare earth concentrate mineral and suspended mineral phase transformation-clean leaching system disclosed by the invention is performed according to the following steps:

Step 1, Preparing:

starting the draught fan, generating negative pressure in a tail gas absorption station, an electric dust remover, the Venturi dryer, the first cyclone separator, the second cyclone separator, the suspension preheating decomposition furnace, and the third cyclone separator, introducing combustion flue gas into the Venturi dryer to remove adsorption water from mixed rare earth concentrate mineral powder and preheat the mixed rare earth concentrate mineral powder;

Step 2, Drying and Separating:

transporting the mixed rare earth concentrate mineral powder in the feed hopper to the feed belt through a screw feeder, then transporting the mixed rare earth concentrate mineral powder into the Venturi dryer, after drying and dehydrating, sending the mixed rare earth concentrate mineral powder preheated to 150-200° C. into the first cyclone separator, and after cyclone separation, sending a bottom material into the suspension preheating decomposition furnace through the second cyclone separator;

Step 3, Suspension Preheating Decomposition:

burning the introduced mixed gas of air and reducing gas in the main burner to generate flue gas, introducing the flue gas through the air inlet in a bottom of the suspension preheating decomposition furnace, preheating the material entering the suspension preheating decomposition furnace to decompose the material into a suspension state, and controlling a temperature of the material to 550-800° C. for 1-10 min, so as to obtain the material after suspension preheating decomposition;

Step 4, Mineral Phase Transformation:

introducing the material after suspension preheating decomposition to the third cyclone separator, after cyclone separation, firstly introducing a bottom material to the first fluidization sealing valve, isolating oxygen and air, then introducing the material to the mineral phase transformation machine, introducing nitrogen gas into the mineral phase transformation machine as protection gas, maintaining the material to the suspension state and complete mineral phase transformation under an action of the protection gas, and controlling the temperature of the material to 450-650° C. for 1-2.5 hours, so as to obtain the material after mineral phase transformation;

Step 5, Water Cooling:

discharging products through the second fluidization sealing valve for the material after mineral phase transformation, then discharging the mineral phase transformation products into the water cooling tank through the fifth cyclone separator and the sixth cyclone separator for water cooling, and finally, introducing the products after water cooling into the ball mill;

wherein the temperature of the material discharged into the water cooling tank is 200° C. or below.

Step 6, Cleaning Leaching (1) after the material is ground into powder in the ball mill, discharging the powder into the screw classifier, controlling a grain size of the material to about 45 p m and a content to 85-95 wt %, and then discharging the material into the first acid leaching tank;

(2) performing hydrochloric acid leaching in the first acid leaching tank, wherein a concentration of the hydrochloric acid is 8-13 mol/L, and a mass ratio of a REO in the mixed rare earth concentrate mineral powder to the hydrochloric acid is 1 to (1-3), a leaching temperature is 65-100° C., and a leaching time is 1-3 hours, introducing leached residues into a first pressure filter for pressure filtration, so as to obtain acid leached residues and leached acid liquor, and introducing the leached acid liquor into the second acid leaching tank;

(3) introducing the acid leached residues into the alkali leaching tank for NaOH alkali decomposition, wherein a mass concentration of the NaOH is 50-80%, a mass ratio of a REO in the acid leached residues to the NaOH is 1 to (0.5-2.5), a temperature is 130-220° C., and a time is 1-2 hours, discharging alkali decomposed residues into the water washing tank for water washing with a water washing temperature of 55-100° C., and a final pH for water washing of 7-9;

(4) introducing the alkali decomposed residues after water washing into a second pressure filter for pressure filtration, introducing filtrate into a washing liquor recovery tank, and introducing filter residues into the second acid leaching tank;

(5) mixing the filter residues with the introduced leached acid liquor in the second acid leaching tank, and then performing joint stirring and acid leaching at an acid leaching temperature of 40-80° C., wherein a mass ratio of the filter residues to the leached acid liquor is 1 to (5-10), and a time is 1-3 hours, so as to obtain a leached product; and (6) after introducing the leached product into the neutralization tank, adding the NaOH into the neutralization tank, performing continuous stirring and mixing, wherein a mass concentration of the NaOH is 15-35%, a stirring time is 1-2.5 hours, and a final pH is 4-5, after neutralization is completed, introducing neutralization liquor into a chlorination rare earth product tank, and introducing neutralization residues into a thorium residue containing pond.

In the method of using the system, after the mixed rare earth concentrate mineral powder which is preheated to 150-200° C. is introduced into the first cyclone separator, a separated dust is introduced into the electric dust remover, the flue gas after dust removal is introduced into the tail gas absorption station to be purified, and then the purified flue gas is discharged from a chimney.

In the method of using the system, the dust collected by the electric dust remover returns to the third cyclone separator through a pneumatic lifting pump under an action of an ash returning fan.

In the method of using the system, the flue gas generated in a running process of the suspension preheating decomposition furnace returns to the Venturi dryer through the third cyclone separator and the second cyclone separator so as to realize waste heat utilization.

In the method of using the system, the dust and the gas, separated by the fifth cyclone separator, return to the third cyclone separator.

In the method of using the system, the dust and the gas separated by a sixth cyclone separator return to the fifth cyclone separator, and redundant dust particles separated by the fifth cyclone separator enter a second ash hopper when passing through a pipeline.

In the method of using the system, further comprising classifying powder ground in the ball mill by a screw classifier, and returning sand to the ball mill to be reground.

In the method of using the system, fuel in the main burner is controlled to fully burn, and the mineral phase transformation process in the suspension preheating decomposition furnace is maintained in an oxygen free or low oxygen environment to achieve directional transformation of $CeCO_3F$ to CeOF and prevent the generation of Ce (IV). The main reactions are:

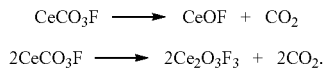

$$CeCO_3F \longrightarrow CeOF + CO_2$$
$$2CeCO_3F \longrightarrow 2Ce_2O_3F_3 + 2CO_2.$$

The invention provides a mixed rare earth concentrate mineral and suspended mineral phase transformation-clean leaching system and a method, compared with a conventional oxidizing roasting technique and device for processing a rare earth concentrate mineral, a suspended mineral phase transformation system provided by the invention can provide higher heat and mass transfer efficiency, so that mineral powder granules are subjected to phase transformation in a fluidization system, directional transformation of $CeCO_3F$ to CeOF at low temperatures (450-650° C.) can be realized within a short period of time, thereby preventing the Ce (III) in rare earth from being the oxidated into the Ce (VI) and generation of HF gas; the leaching rate of the rare earth is increased, and at the same time, interference of F in the leaching liquor is prevented; and in addition, the addition of reducing agents in the hydrochloric acid leaching process can be also be reduced or avoided, thereby reducing reagent costs. The entire process of mineral phase transformation and leaching in the system achieves waste heat utilization and separation material recovery treatment, and no emission of gases containing fluorine, chlorine, sulfur, etc. occurs, thereby eliminating waste gas pollution and reducing environmental pressure.

Compared to the existing rare earth concentrate roasting technique, the system disclosed by the invention can achieve lower-temperature phasing transformation of rare earth minerals, with a minimum transformation temperature of 450° C., and the transformed mineral phase is CeOF.

BRIEF DESCRIPTION OF THE DRAWINGS

in FIG. 1, 1: feed hopper; 2: screw feeder; 3: feed belt; 4: Venturi dryer; 5: first cyclone separator; 6: second cyclone separator; 7: suspension preheating decomposition furnace; 8: main burner; 9: third cyclone separator; 10: first fluidization sealing valve; 11: mineral phase transformation machine; 12: fourth cyclone separator; 13: second fluidization sealing valve; 14: fifth cyclone separator; 15: sixth cyclone separator; 16: water cooling tank; 17: ball mill; 18: screw classifier; 19: first acid leaching tank; 20: first pressure filter; 21: alkali leaching tank; 22: water washing tank; 23: second pressure filter; 24: washing liquor recovery tank; 25: second acid leaching tank; 26: neutralization tank; 27: chlorination rare earth product tank; 28: thorium residue containing pond; 29: electric dust remover; 30: tail gas absorption station; 31: draught fan; 32: chimney; 33: pneumatic lifting pump; 34: ash returning fan; 35: first ash hopper; 36: second ash hopper; 37: drying heat generator;

in FIG. 3, 10-1: feed opening; 10-2: discharge opening; 10-3: top fluidization sealing baffle; 10-4: fluidization room; 10-5: fluidization sealing air distributor; 10-6: bottom fluidization sealing baffle; 10-7: nitrogen gas inlet stop valve; 10-8: nitrogen gas inlet.

DETAILED DESCRIPTION OF THE PREFERRED EMBODIMENT

The following will provide a further detailed explanation of the invention in conjunction with embodiments.

The mixed rare earth concentrate mineral selected in the embodiment of the invention has a rare earth grade REO of 52-67% and an iron grade TFe of 5-13%.

In the embodiment of the invention, washing liquor can be used to recover alkaline solutions and fluorine and phosphorus components after recovery treatment.

In the embodiment of the invention, thorium containing residues can be sealed up for safekeeping or thorium elements can be further recovered.

The following will provide a further detailed explanation of the invention in conjunction with drawings and embodiments. The equipment, reagents, and materials described in the following embodiments can be obtained from commercial channels unless otherwise specified; and the test methods, unless otherwise specified, are all routine methods.

Embodiment 1

Figure 1:
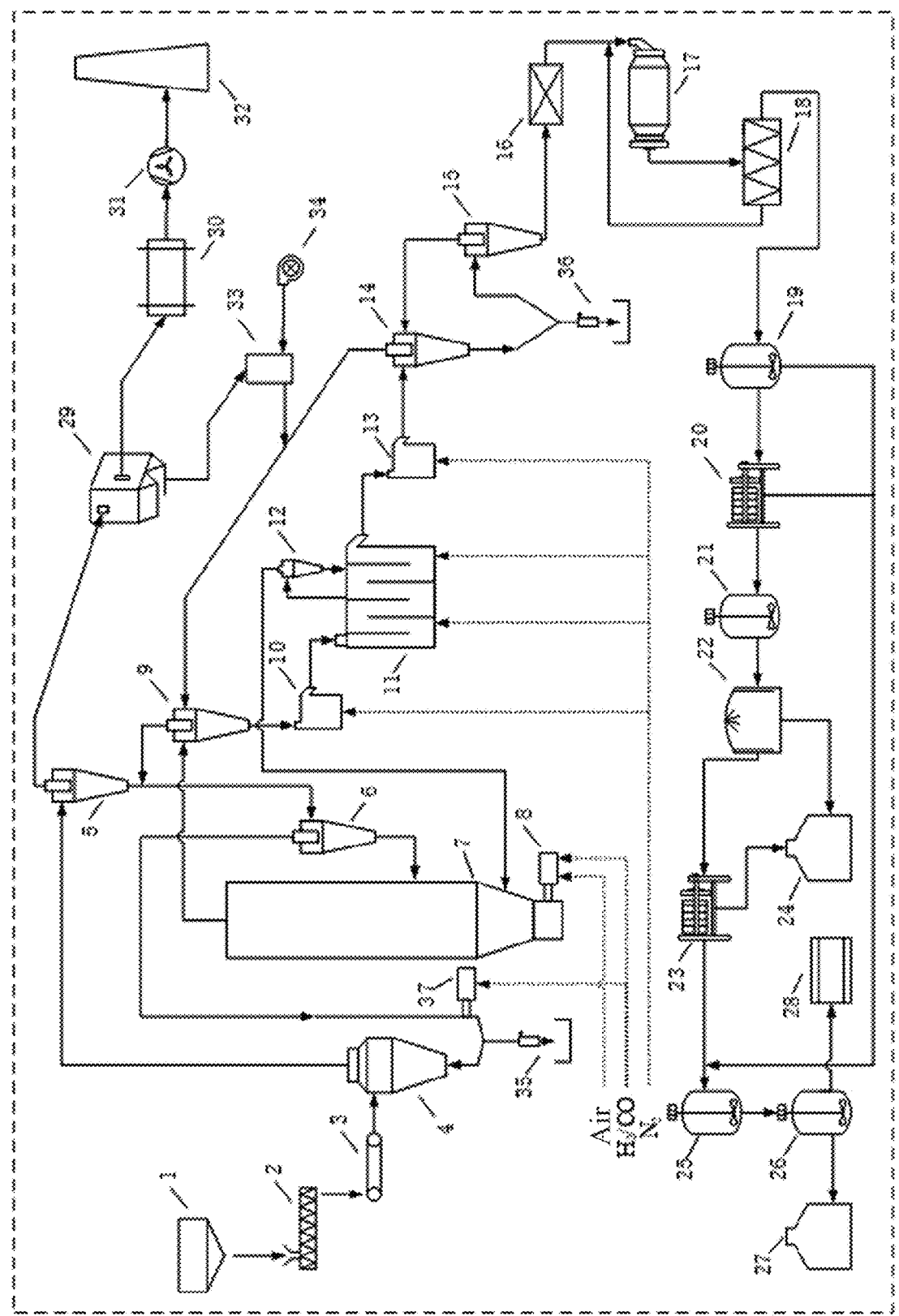
FIG. 1 is a schematic diagram of a mixed rare earth concentrate mineral and suspended mineral phase transformation-clean leaching system.

A mixed rare earth concentrate mineral and suspended mineral phase transformation-clean leaching system disclosed by the invention, as shown in FIG. 1, comprises a feed hopper 1, a screw feeder 2, a feed belt 3, a Venturi dryer 4, a first cyclone separator 5, a second cyclone separator 6, a suspension preheating decomposition furnace 7, a third cyclone separator 9, a first fluidization sealing valve 10, a mineral phase transformation machine 11, a fourth cyclone separator 12, a second fluidization sealing valve 13, a fifth cyclone separator 14, a sixth cyclone separator 15, a water cooling tank 16, a ball mill 17, a first acid leaching tank 19, an alkali leaching tank 21, a water washing tank 22, a second acid leaching tank 25 and a neutralization tank 26.

A discharge opening of the feed hopper 1 communicates with a feed opening of the screw feeder 2, a discharge opening of the screw feeder 2 communicates with the feed belt 3, and a discharge end of the feed belt 3 communicates with a feed opening of the Venturi dryer 4; a top discharge opening of the Venturi dryer 4 communicates with a feed opening of the first cyclone separator 5 through a pipeline, a bottom discharge opening of the first cyclone separator 5 communicates with the second cyclone separator 6, a bottom discharge opening of the second cyclone separator 6 communicates with the suspension preheating decomposition furnace 7, a main burner 8 is arranged at a bottom of the suspension preheating decomposition furnace 7, and communicates with an H$_2$/CO gas source and an air source through a pipeline; a top discharge opening of the suspension preheating decomposition furnace 7 communicates with a feed opening of the third cyclone separator 9 through a pipeline, and a bottom discharge opening of the third cyclone separator 9 communicates with the first fluidization sealing valve 10; the first fluidization sealing valve 10 communicates with the mineral phase transformation machine 11, a discharge opening of the mineral phase transformation machine 11 communicates with the second fluidization sealing valve 13, a discharge opening of the second fluidization sealing valve 13 communicates with a feed opening of the fifth cyclone separator 14, a bottom discharge opening of the fifth cyclone separator 14 communicates with the water cooling tank 16 through the sixth cyclone separator 15, the water cooling tank 16 communicates with the ball mill 17, a discharge opening of the ball mill 17 communicates with a feed opening of a screw classifier 18, an overflow opening of the screw classifier 18 communicates with a feed opening of the first acid leaching tank 19 through a pipeline, a sand returning opening of the screw classifier 18 communicates with the ball mill 17, a discharge opening of the first acid leaching tank 19 communicates with a first pressure filter 20, a discharge opening of the first pressure filter 20 communicates with the alkali leaching tank 21, the alkali leaching tank 21 communicates with the water washing tank 22, the water washing tank 22 communicates with a feed opening of a second pressure filter 23, a discharge opening of the second pressure filter 23 communicates with the second acid leaching tank 25, and the second acid leaching tank 25 communicates with the neutralization tank 26.

A top of the first cyclone separator 5 communicates with an electric dust remover 29 through a pipeline, the electric dust remover 29 communicates with a tail gas absorption station 30, the tail gas absorption station 30 communicates with a draught fan 31, and the draught fan 31 communicates with a chimney 32 through a pipeline.

A discharge opening of the electric dust remover 29 communicates with a feed opening of a pneumatic lifting pump 33, the pneumatic lifting pump 33 communicates with an ash returning fan 34, and a discharge opening of the pneumatic lifting pump 33 communicates with the third cyclone separator 9 through a pipeline.

A top discharge opening of the sixth cyclone separator 15 communicates with the fifth cyclone separator 14 through a pipeline, a top discharge opening of the fifth cyclone separator 14 communicates with the third cyclone separator 9 through a pipeline, a top discharge opening of the third cyclone separator 9 communicates with the second cyclone separator 6 through a pipeline, and a top discharge opening of the second cyclone separator 6 communicates with the Venturi dryer 4 through a pipeline; a drying heat generator 37 is arranged on the pipeline where the second cyclone separator 6 communicates with the Venturi dryer 4, and communicates with the H$_2$/CO gas source through a pipeline, and a first ash hopper 35 is arranged on the pipeline.

A second ash hopper 36 is arranged on the pipeline where the fifth cyclone separator 14 is connected with the sixth cyclone separator 15 for preventing part of dust and granules from blocking in the pipeline in the material transfer process and storing redundant dust particles discharged from the pipeline.

An air inlet is formed in a bottom of the mineral phase transformation machine 11 and communicates with a nitrogen gas source pipeline, an air exchange opening is formed in a top of the mineral phase transformation machine 11 and communicates with the fourth cyclone separator 12; a bottom discharge opening of the fourth cyclone separator 12 communicates with the mineral phase transformation machine 11, and a top discharge opening of the fourth cyclone separator 12 communicates with the suspension preheating decomposition furnace 7.

A liquid drain opening of the first acid leaching tank 19 communicates with the second acid leaching tank 25 through a pipeline.

A liquid drain opening below the first pressure filter 20 communicates with the second acid leaching tank 25 through a pipeline.

A liquid drain opening of the water washing tank 22 communicates with a washing liquor recovery tank 24 through a pipeline.

A liquid drain opening below the second pressure filter 23 communicates with the washing liquor recovery tank 24 through a pipeline.

A liquid drain opening of the neutralization tank 26 communicates with a chlorination rare earth product tank 27.

A discharge opening of the neutralization tank 26 communicates with a thorium residue containing pond 28.

The first acid leaching tank 19, the alkali leaching tank 21, the water washing tank 22, the second acid leaching tank 25, and the neutralization tank 26 are all provided with pH online monitoring devices and temperature control devices.

The suspension preheating decomposition furnace, the mineral phase transformation machine, and the dust remover are all provided with temperature measuring devices for monitoring the operating temperature, and pressure sensing devices for monitoring pressure.

Figure 2:
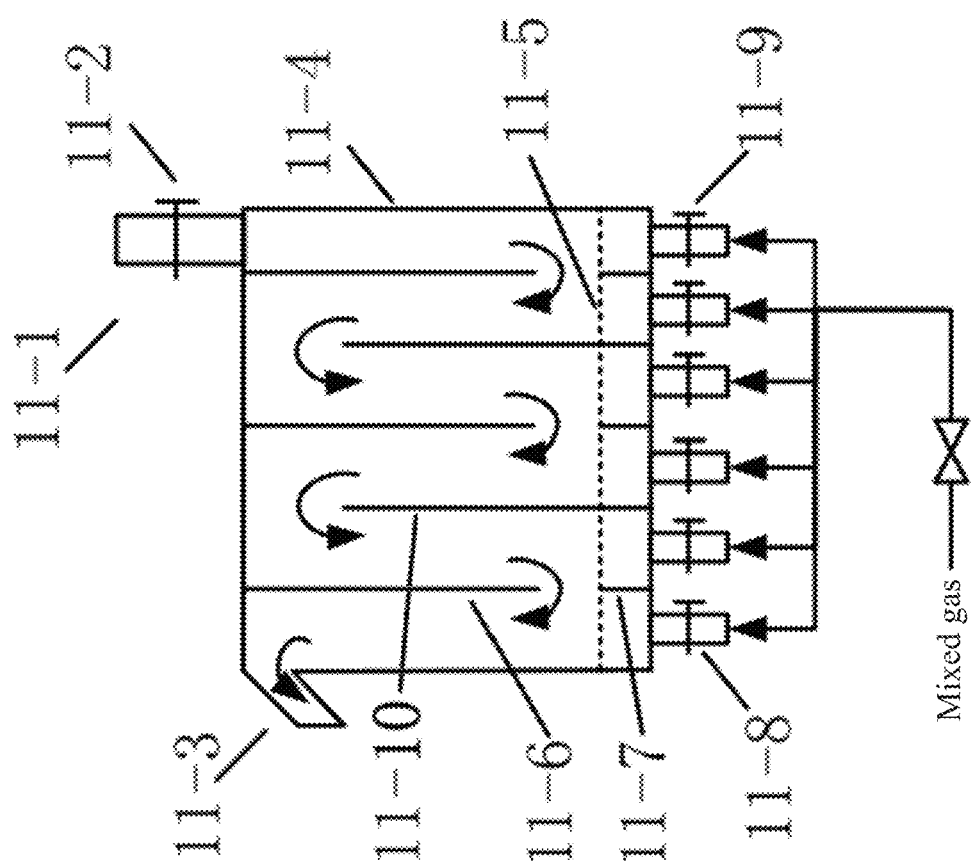
FIG. 2 is a schematic diagram of a mineral phase transformation machine of the mixed rare earth concentrate mineral and suspended mineral phase transformation-clean leaching system; and in FIG. 2, 11-1: mineral phase transformation feed opening; 11-2: mineral phase transformation stop valve; 11-3: mineral phase transformation discharge opening; 11-4: reducing room; 11-5: mineral phase transformation air distributor; 11-6: top baffle; 11-7: first bottom baffle; 11-8: mineral phase transformation air inlet; 11-9: air inlet stop valve, 11-10: second bottom baffle.

The main effect of the mineral phase transformation machine 11 with the schematic diagram as shown in FIG. 2 is to provide a fluidization reducing room for mineral powder so as to realize high-efficiency mineral phase transformation. A main body of the mineral phase transformation machine comprises a mineral phase transformation machine housing which forms a reducing room 11-4, a mineral phase transformation feed opening 11-1 and a mineral phase transformation discharge opening 11-3 are formed in the housing, a mineral phase transformation stop valve 11-2 is arranged on the pipeline provided with the mineral phase transformation feed opening 11-1, a plurality of top baffles 11-6 are arranged on an inner side of an upper part of the housing, a plurality of second bottom baffles 11-10 are arranged on an inner side of a lower part of the housing, a first bottom baffle 11-7 is arranged just below each top baffle 11-6, a gap is reserved between each first bottom baffle 11-7 and each top baffle 11-6, the top baffles 11-6, the first bottom baffles 11-7 and the second bottom baffles 11-10 jointly form a mineral powder flow passage, and a space formed between each top baffle 11-6 and each second bottom baffle 11-10 is a vertical passage; a mineral phase transformation air distributor 11-5 is arranged on one side where the first bottom baffles 11-7 and the second bottom baffles 11-10 are arranged, of the housing, for evenly distributing airflow; and a mineral phase transformation air inlet 11-8 is formed in each vertical passage, an air inlet stop valve 11-9 is also arranged on the pipeline provided with the mineral phase transformation air inlet 11-8, and the mineral phase transformation air inlet 11-8 is used for providing a sufficient amount of aeration air and fluidization air to result in stable flowing of mineral.

Figure 3:
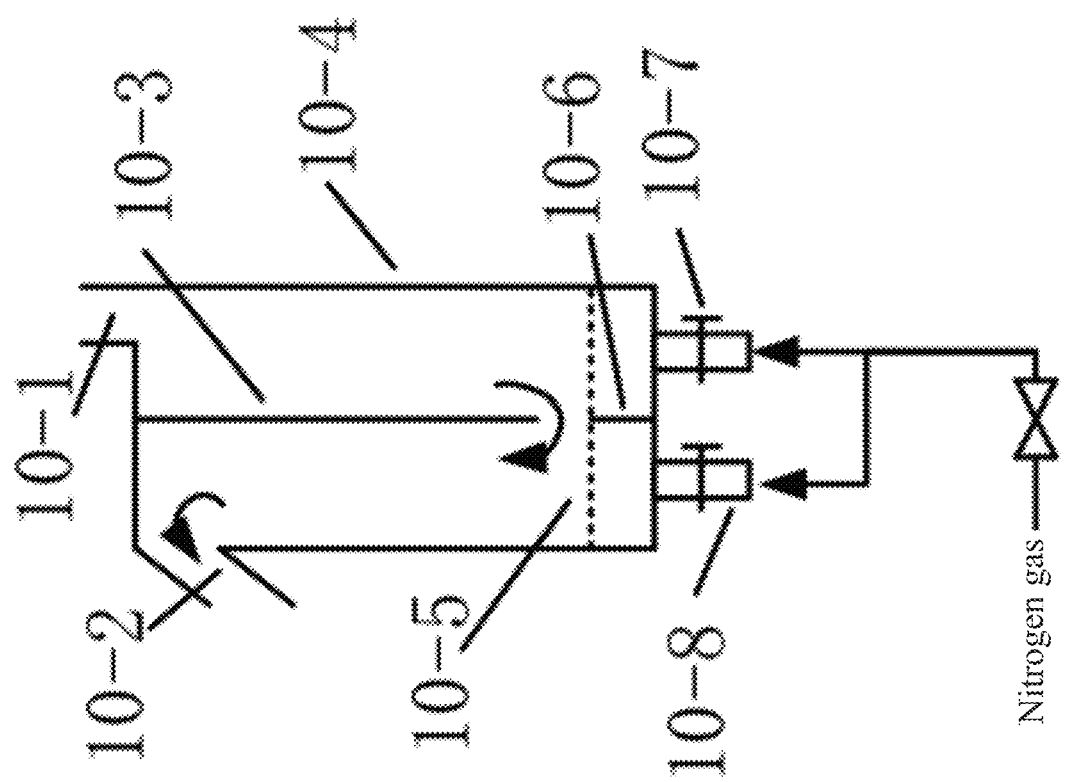
FIG. 3 is a schematic diagram of a fluidization sealing valve device of the mixed rare earth concentrate mineral and suspended mineral phase transformation-clean leaching system.

The main effect of the first fluidization sealing valve 10 and the second fluidization sealing valve 13 with the structure diagrams as shown in FIG. 3 is to isolate gas which is introduced along with the mineral powder in the previous stage. A main body of each of the first fluidization sealing valve and the second fluidization sealing valve comprises a fluidization sealing housing, a feed opening 10-1 and a discharge opening 10-2 are formed in the fluidization sealing housing, the fluidization sealing housing forms a fluidization room 10-4, a top fluidization sealing baffle 10-3 is arranged at a top of the fluidization room, a bottom fluidization sealing baffle 10-6 is arranged at a bottom of the fluidization room, and a fluidization sealing air distributor 10-5 is arranged on one side of the bottom fluidization sealing baffle 10-6 for evenly distributing airflow; and a nitrogen gas inlet 10-8 is arranged in each vertical passage, a nitrogen gas inlet stop valve 10-7 is arranged on the pipeline provided with the nitrogen gas inlet 10-8, and the nitrogen gas inlet 10-8 is used for providing a sufficient amount of aeration air and fluidization air to result in stable flowing of mineral.

A mixed rare earth concentrate mineral and suspended mineral phase transformation-clean leaching method disclosed by the invention, adopting the system, is performed according to the following steps:

starting a draught fan 31, generating negative pressure to in the electric dust remover 29, the tail gas absorption station 30, the Venturi dryer 4, the first cyclone separator 5, the second cyclone separator 6, the suspension preheating decomposition furnace 7, and the third cyclone separator 9, introducing combustion flue gas into the Venturi dryer 4, to remove adsorption water from mineral powder and preheat the materials, wherein the material temperature of the discharge opening is 150° C.;

transporting the mixed rare earth concentrate mineral powder in the feed hopper 1 to the feed belt 3 through a screw feeder 2, then transporting the mineral powder into the Venturi dryer 4 through the feed belt 3, after drying and dehydrating, sending the mixed rare earth concentrate mineral powder into the first cyclone separator 5, and after cyclone separation, sending a bottom material into the suspension preheating decomposition furnace 7 through the second cyclone separator 6;

introducing a top material separated by the first cyclone separator 5 into the electric dust remover 29, introducing the flue gas after dust removal into the tail gas absorption station 30 for purification, and then draining the purified gas from the chimney 32;

collecting the dust by the electric dust remover 29 to return to the third cyclone separator 9 through the pneumatic lifting pump 33 under an action of the ash returning fan 34;

burning the introduced air and coal gas in the main burner 8 to generate flue gas, introducing the flue gas through the air inlet in the bottom of the suspension preheating decomposition furnace 7 for preheating the material entering the suspension preheating decomposition furnace 7 to decompose the material into a suspension state, introducing enough coal gas into the suspension preheating decomposition furnace for burning, maintaining the entire mineral phase transformation process to be performed in an oxygen free or low oxygen environment to achieve directional transformation of $CeCO_3F$ to $CeOF$ and prevent the generation of Ce (IV); controlling the material temperature to 600° C. for 5 min, to obtain a material after suspension preheating decomposition; returning the flue gas generated in a running process of the suspension preheating decomposition furnace 7 to the Venturi dryer 4 through the third cyclone separator 9 and the second cyclone separator 6 so as to realize waste heat utilization;

introducing the material after suspension preheating decomposition to the third cyclone separator 9, after cyclone separation, firstly introducing a bottom material to the first fluidization sealing valve 10, isolating oxygen and air, then introducing the material to the mineral phase transformation machine 11, introducing nitrogen gas into the mineral phase transformation machine 11 as protection gas, maintaining the material to the suspension state and complete mineral phase transformation under an action of the protection gas, and controlling the temperature of the material to 470° C. for 1.5 hours;

discharging mineral phase transformation products through the second fluidization sealing valve 13 for the material after mineral phase transformation, then cooling the products to 200° C. or below through the fifth cyclone separator 14 and the sixth cyclone separator 15, discharging the cooled products into the water cooling tank 16 for water cooling, and finally, introducing the products after water cooling into the ball mill 17; returning the dust and the gas which are separated by the fifth cyclone separator 14 to the third cyclone separator 9; returning the dust and the gas which are separated by the sixth cyclone separator 15 to the fifth cyclone separator 14; and introducing redundant dust particles separated by the fifth cyclone separator 14 to the second ash hopper 36 when passing through a pipeline;

after the material is ground into powder in the ball mill 17, discharging the powder into the screw classifier 18, controlling a grain size of the material to about 45 μm with the content of 90%, returning sand after classification to the ball mill 17 for regrinding, and draining overflow into the first acid leaching tank 19;

performing hydrochloric acid leaching in the first acid leaching tank 19, wherein a concentration of the hydrochloric acid is 10 mol/L, and a mass ratio of a REO in the concentrate mineral to the hydrochloric acid is 1 to 2, a leaching temperature is 85° C., and a leaching time is 2.5 hours, introducing leached residues into the first pressure filter 20 for pressure filtration, and introducing the leaching liquor into the second acid leaching tank 25;

introducing the acid leached residues after solid-liquid separation into the alkali leaching tank 21 for NaOH alkali decomposition, wherein a concentration of the NaOH is 60%, a consumption of the NaOH is that a mass ratio of a REO in the leached residues to the NaOH is 1 to 1, a temperature is 180° C., and a time is 1.5 hours, and discharging alkali decomposed residues into the water washing tank 22 for water washing with a water washing temperature of 80° C., and a final pH for water washing of 8;

introducing the alkali decomposed residues after water washing into the second pressure filter 23 for pressure filtration, introducing filtrate into the washing liquor recovery tank 24, and introducing filter residues into the second acid leaching tank 25;

mixing the filter residues with the introduced acid leached liquor in the second acid leaching tank 25, and then performing joint stirring and acid leaching at an acid leaching temperature of 65° C., wherein a mass ratio of the filter residues to the leached acid liquor is 1 to 8, and a time is 2 hours; and after introducing the leaching liquor into the neutralization tank 26, adding the NaOH into the neutralization tank 26, performing continuous stirring and mixing, wherein a concentration of the NaOH is 20%, a stirring time is 1.5 hours, and a final pH is 4, and after neutralization is completed, introducing neutralization liquor into the chlorination rare earth product tank 27, and introducing neutralization residues into the thorium residue containing pond 28. A REO content of the rare earth chloride solution obtained after neutralization and impurity removal in a soaking solution is 242 g/L, and a rare earth recovery rate is 94.81%.

Embodiment 2

The system structure is the same as Embodiment 1.

The method is the same as Embodiment 1, with the difference being:

(1) the material temperature in the suspension preheating decomposition furnace 7 is controlled at 600° C. and the residence time is 8 min;

(2) the material temperature in the mineral phase transformation machine 11 is controlled at 550° C. and the residence time is 1 hour;

(3) the mineral phase transformation product is ground to about 45 μm, and the content is 92 wt %;

(4) during hydrochloric acid leaching, the concentration of the hydrochloric acid is 9 mol/L, the consumption of the hydrochloric acid is that the mass ratio of the REO in the concentrate mineral to the hydrochloric acid is 1 to 3, the leaching temperature is 70° C., and the leaching time is 2 hours;

(5) during the alkali decomposition, the concentration of the NaOH is 65%, the consumption of the NaOH is that the mass ratio of the REO in the leached residues to the NaOH is 1 to 2.5, the temperature is 170° C., and the time is 2 hours;

(6) during the washing operation, the washing temperature is 70° C. and the final pH for water washing is 8;

(7) during mixed acid leaching operation, the acid leaching temperature is 60° C., and the mass ratio of the filter residues to the leached acid liquor is 1 to 7, and the time is 3 hours; and (8) during neutralization operation, the concentration of the NaOH is 25%, the stirring time is 1 hour, and the final pH is 5, the REO content of the rare earth chloride solution obtained after neutralization and impurity removal in the soaking solution is 226 g/L, and the rare earth recovery rate is 96.25%.

Embodiment 3

The system structure is the same as Embodiment 1.

The method is the same as Embodiment 1, with the difference being:

(1) the material temperature in the suspension preheating decomposition furnace 7 is controlled at 700° C. and the residence time is 10 min;

(2) the material temperature in the mineral phase transformation machine 11 is controlled at 620° C. and the residence time is 1.2 hours;

(3) the mineral phase transformation product is ground to about 45 μm, and the content is 90 wt %;

(4) during hydrochloric acid leaching, the concentration of the hydrochloric acid is 11 mol/L, the consumption of the hydrochloric acid is that the mass ratio of the REO in the concentrate mineral to the hydrochloric acid is 1 to 2.5, the leaching temperature is 75° C., and the leaching time is 1 hour;

(5) during the alkali decomposition, the concentration of the NaOH is 70%, the consumption of the NaOH is that the mass ratio of the REO in the leached residues to the NaOH is 1 to 2, the temperature is 150° C., and the time is 1 hour;

(6) during the washing operation, the washing temperature is 55° C. and the final pH for water washing is 7.5;

(7) during mixed acid leaching operation, the acid leaching temperature is 65° C., and the mass ratio of the filter residues to the leached acid liquor is 1 to 7.5, and the time is 2 hours; and (8) during neutralization operation, the concentration of the NaOH is 20%, the stirring time is 1.5 hours, and the final pH is 4.5, the REO content of the rare earth chloride solution obtained after neutralization and impurity removal in the soaking solution is 240 g/L, and the rare earth recovery rate is 95.33%.

Embodiment 4

The system structure is the same as Embodiment 1.

The method is the same as Embodiment 1, with the difference being:

(1) the material temperature in the suspension preheating decomposition furnace 7 is controlled at 750° C. and the residence time is 6 min;

(2) the material temperature in the mineral phase transformation machine 11 is controlled at 550° C. and the residence time is 1.5 hours;

(3) the mineral phase transformation product is ground to about 45 μm, and the content is 90 wt %;

(4) during hydrochloric acid leaching, the concentration of the hydrochloric acid is 13 mol/L, the consumption of the hydrochloric acid is that the mass ratio of the REO in the concentrate mineral to the hydrochloric acid is 1 to 2, the leaching temperature is 90° C., and the leaching time is 1.5 hours;

(5) during the alkali decomposition, the concentration of the NaOH is 50%, the consumption of the NaOH is that the mass ratio of the REO in the leached residues to the NaOH is 1 to 1, the temperature is 160° C., and the time is 1 hour;

(6) during the washing operation, the washing temperature is 60° C. and the final pH for water washing is 9;

(7) during mixed acid leaching operation, the acid leaching temperature is 70° C., and the mass ratio of the filter residues to the leached acid liquor is 1 to 8, and the time is 2.5 hours; and (8) during neutralization operation, the concentration of the NaOH is 15%, the stirring time is 1.5 hours, and the final pH is 5, the REO content of the rare earth chloride solution obtained after neutralization and impurity removal in the soaking solution is 213 g/L, and the rare earth recovery rate is 96.13%.

Embodiment 5

The system structure is the same as Embodiment 1.
The method is the same as Embodiment 1, with the difference being:
(1) the material temperature in the suspension preheating decomposition furnace 7 is controlled at 700° C. and the residence time is 7 min;
(2) the material temperature in the mineral phase transformation machine 11 is controlled at 500° C. and the residence time is 1 hour;
(3) the mineral phase transformation product is ground to about 45 m, and the content is 95 wt %;
(4) during hydrochloric acid leaching, the concentration of the hydrochloric acid is 12 mol/L, the consumption of the hydrochloric acid is that the mass ratio of the REO in the concentrate mineral to the hydrochloric acid is 1 to 2, the leaching temperature is 80° C., and the leaching time is 2 hours;
(5) during the alkali decomposition, the concentration of the NaOH is 60%, the consumption of the NaOH is that the mass ratio of the REO in the leached residues to the NaOH is 1 to 1.5, the temperature is 160° C., and the time is 1.5 hours;
(6) during the washing operation, the washing temperature is 65° C. and the final pH for water washing is 8;
(7) during mixed acid leaching operation, the acid leaching temperature is 65° C., and the mass ratio of the filter residues to the leached acid liquor is 1 to 8, and the time is 2 hours; and
(8) during neutralization operation, the concentration of the NaOH is 25%, the stirring time is 1.5 hours, and the final pH is 4, the REO content of the rare earth chloride solution obtained after neutralization and impurity removal in the soaking solution is 252 g/L, and the rare earth recovery rate is 94.57%.

Embodiment 6

The system structure is the same as Embodiment 1.
The method is the same as Embodiment 1, with the difference being:
(1) the material temperature in the suspension preheating decomposition furnace 7 is controlled at 650° C. and the residence time is 8 min;
(2) the material temperature in the mineral phase transformation machine 11 is controlled at 500° C. and the residence time is 1 hour;
(3) the mineral phase transformation product is ground to about 45 μm, and the content is 95 wt %;
(4) during hydrochloric acid leaching, the concentration of the hydrochloric acid is 12 mol/L, the consumption of the hydrochloric acid is that the mass ratio of the REO in the concentrate mineral to the hydrochloric acid is 1 to 3, the leaching temperature is 85° C., and the leaching time is 2 hours;
(5) during the alkali decomposition, the concentration of the NaOH is 55%, the consumption of the NaOH is that the mass ratio of the REO in the leached residues to the NaOH is 1 to 1.5, the temperature is 170° C., and the time is 1 hour;
(6) during the washing operation, the washing temperature is 70° C. and the final pH for water washing is 8;
(7) during mixed acid leaching operation, the acid leaching temperature is 60° C., and the mass ratio of the filter residues to the leached acid liquor is 1 to 7, and the time is 3 hours; and
(8) during neutralization operation, the concentration of the NaOH is 20%, the stirring time is 2 hours, and the final pH is 4.5, the REO content of the rare earth chloride solution obtained after neutralization and impurity removal in the soaking solution is 247 g/L, and the rare earth recovery rate is 95.32%.

Embodiment 7

The system structure is the same as Embodiment 1.
The method is the same as Embodiment 1, with the difference being:
(1) the material temperature in the suspension preheating decomposition furnace 7 is controlled at 700° C. and the residence time is 7 min;
(2) the material temperature in the mineral phase transformation machine 11 is controlled at 450° C. and the residence time is 2 hours;
(3) the mineral phase transformation product is ground to about 45 μm, and the content is 92 wt %;
(4) during hydrochloric acid leaching, the concentration of the hydrochloric acid is 11 mol/L, the consumption of the hydrochloric acid is that the mass ratio of the REO in the concentrate mineral to the hydrochloric acid is 1 to 2.5, the leaching temperature is 85° C., and the leaching time is 1.5 hours;
(5) during the alkali decomposition, the concentration of the NaOH is 65%, the consumption of the NaOH is that the mass ratio of the REO in the leached residues to the NaOH is 1 to 1, the temperature is 170° C., and the time is 2 hours;
(6) during the washing operation, the washing temperature is 65° C. and the final pH for water washing is 7;
(7) during mixed acid leaching operation, the acid leaching temperature is 70° C., and the mass ratio of the filter residues to the leached acid liquor is 1 to 7, and the time is 2 hours; and
(8) during neutralization operation, the concentration of the NaOH is 25%, the stirring time is 1.5 hours, and the final pH is 4, the REO content of the rare earth chloride solution obtained after neutralization and impurity removal in the soaking solution is 229 g/L, and the rare earth recovery rate is 95.89%.

Embodiment 8

The system structure is the same as Embodiment 1.
The method is the same as Embodiment 1, with the difference being:
(1) the material temperature in the suspension preheating decomposition furnace 7 is controlled at 600° C. and the residence time is 8 min;
(2) the material temperature in the mineral phase transformation machine 11 is controlled at 600° C. and the residence time is 2.5 hours;
(3) the mineral phase transformation product is ground to about 45 μm, and the content is 95 wt %;
(4) during hydrochloric acid leaching, the concentration of the hydrochloric acid is 10 mol/L, the consumption of the hydrochloric acid is that the mass ratio of the REO in the concentrate mineral to the hydrochloric acid is 1 to 2, the leaching temperature is 75° C., and the leaching time is 2 hours;
(5) during the alkali decomposition, the concentration of the NaOH is 60%, the consumption of the NaOH is that the mass ratio of the REO in the leached residues to the NaOH is 1 to 1, the temperature is 150° C., and the time is 1.5 hours;

(6) during the washing operation, the washing temperature is 70° C. and the final pH for water washing is 8;

(7) during mixed acid leaching operation, the acid leaching temperature is 65° C., and the mass ratio of the filter residues to the leached acid liquor is 1 to 7, and the time is 2 hours; and (8) during neutralization operation, the concentration of the NaOH is 20%, the stirring time is 1 hour, and the final pH is 4.5, the REO content of the rare earth chloride solution obtained after neutralization and impurity removal in the soaking solution is 222 g/L, and the rare earth recovery rate is 95.66%.

What is claimed is:

1. A mixed rare earth concentrate mineral and suspended mineral phase transformation-clean leaching system, comprising:

a feed hopper, a Venturi dryer, a first cyclone separator, a second cyclone separator, a suspension preheating decomposition furnace, a third cyclone separator, a first fluidization sealing valve, a mineral phase transformation machine, a second fluidization sealing valve, a fifth cyclone separator, a water cooling tank, a ball mill, a first acid leaching tank, an alkali leaching tank, a water washing tank, a second acid leaching tank and a neutralization tank, wherein the feed hopper communicates with the Venturi dryer, a top discharge opening of the Venturi dryer communicates with a feed opening of the first cyclone separator through a pipeline, a bottom discharge opening of the first cyclone separator communicates with the second cyclone separator, a bottom discharge opening of the second cyclone separator communicates with the suspension preheating decomposition furnace, a top discharge opening of the suspension preheating decomposition furnace communicates with a feed opening of the third cyclone separator through a pipeline, and a bottom discharge opening of the third cyclone separator communicates with the first fluidization sealing valve; the first fluidization sealing valve communicates with the mineral phase transformation machine, a discharge opening of the mineral phase transformation machine communicates with the second fluidization sealing valve, a discharge opening of the second fluidization sealing valve communicates with a feed opening of the fifth cyclone separator, a bottom discharge opening of the fifth cyclone separator communicates with the water cooling tank, the water cooling tank communicates with the ball mill, a discharge opening of the ball mill communicates with a feed opening of the first acid leaching tank, a discharge opening of the first acid leaching tank communicates with the alkali leaching tank, the alkali leaching tank communicates with the water washing tank, the water washing tank communicates with the second acid leaching tank, and the second acid leaching tank communicates with the neutralization tank, wherein a top of the first cyclone separator communicates with an electric dust remover through a pipeline, the electric dust remover communicates with a tail gas absorption station, the tail gas absorption station communicates with a draught fan, and the draught fan communicates with a chimney through a pipeline; a discharge opening of the electric dust remover communicates with a feed opening of a pneumatic lifting pump, the pneumatic lifting pump communicates with an ash returning fan, and a discharge opening of the pneumatic lifting pump communicates with the third cyclone separator through a pipeline; a sixth cyclone separator is also arranged, a bottom discharge opening of the fifth cyclone separator communicates with the sixth cyclone separator through a pipeline on which a second ash hopper is arranged, a top discharge opening of the sixth cyclone separator communicates with the fifth cyclone separator through a pipeline, a top discharge opening of the fifth cyclone separator communicates with the third cyclone separator through a pipeline, a top discharge opening of the third cyclone separator communicates with the second cyclone separator through a pipeline, and a top discharge opening of the second cyclone separator communicates with the Venturi dryer through a pipeline on which a drying heat generator and a first ash hopper are mounted, wherein the drying heat generator communicates with a reducing gas source through a pipeline, and $H_2$ and/or CO are/is selected as the reducing gas source, wherein an air inlet is formed in a bottom of the mineral phase transformation machine and communicates with a nitrogen gas source pipeline, an air exchange opening is formed in a top of the mineral phase transformation machine and communicates with a fourth cyclone separator; a bottom discharge opening of the fourth cyclone separator communicates with the mineral phase transformation machine, and a top discharge opening of the fourth cyclone separator communicates with the suspension preheating decomposition furnace; a main body of the mineral phase transformation machine comprises a mineral phase transformation machine housing which forms a reducing room, a mineral phase transformation feed opening and a mineral phase transformation discharge opening are formed in the housing, a plurality of top baffles are arranged on an inner side of an upper part of the housing, a plurality of second bottom baffles are arranged on an inner side of a lower part of the housing, a first bottom baffle is arranged just below each top baffle, a gap is reserved between each first bottom baffle and each top baffle, the top baffles, the first bottom baffles and the second bottom baffles jointly form a mineral powder flow passage, and a space formed between each top baffle and each second bottom baffle is a vertical passage; a mineral phase transformation air distributor is arranged on one side where the first bottom baffles and the second bottom baffles are arranged, of the housing for evenly distributing airflow; and a mineral phase transformation air inlet is formed in each vertical passage for providing a sufficient amount of aeration air and fluidization air to result in stable flowing of mineral powder, wherein a main body of each of the first fluidization sealing valve and the second fluidization sealing valve comprises a fluidization sealing housing which forms a fluidization room, a top fluidization sealing baffle is arranged at a top of the fluidization room, a bottom fluidization sealing baffle is arranged just below the top fluidization sealing baffle, and a fluidization sealing air distributor is arranged on one side of the bottom fluidization sealing baffle for evenly distributing airflow; a nitrogen gas inlet is formed in each vertical passage for providing a sufficient amount of aeration air and fluidization air to result in stable flowing of mineral powder; and air inlets are formed in bottoms of the first fluidization sealing valve and the second fluidization sealing valve to communicate with the nitrogen gas source pipeline.

2. The mixed rare earth concentrate mineral and suspended mineral phase transformation-clean leaching system of claim 1, further comprising a screw feeder and a feed belt, wherein a discharge opening of the feed hopper communicates with a feed opening of the screw feeder, a discharge opening of the screw feeder communicates with the feed belt, and a discharge end of the feed belt communicates with a feed opening of the Venturi dryer; and, a main burner is arranged at a bottom of the suspension preheating decomposition furnace, and communicates with a reducing gas source and an air source through a pipeline.

3. The mixed rare earth concentrate mineral and suspended mineral phase transformation-clean leaching system of claim 1, wherein a discharge opening of the ball mill communicates with a feed opening of a screw classifier, an overflow opening of the screw classifier communicates with a feed opening of the first acid leaching tank through a pipeline, and a sand returning opening of the screw classifier communicates with the ball mill; a liquid drain opening of the first acid leaching tank communicates with the second acid leaching tank through a pipeline; the mixed rare earth concentrate mineral and suspended mineral phase transformation-clean leaching system further comprises a first pressure filter, a discharge opening of the first acid leaching tank communicates with the first pressure filter, a discharge opening of the first pressure filter communicates with the alkali leaching tank, and a liquid drain opening below the first pressure filter communicates with the second acid leaching tank through a pipeline; the alkali leaching tank communicates with the water washing tank, and a liquid drain opening of the water washing tank communicates with a washing liquor recovery tank through a pipeline; and/or, the mixed rare earth concentrate mineral and suspended mineral phase transformation-clean leaching system further comprises a second pressure filter, a discharge opening of the water washing tank communicates with a feed opening of the second pressure filter, a discharge opening of the second pressure filter communicates with the second acid leaching tank, and a liquid drain opening below the second pressure filter communicates with the washing liquor recovery tank through a pipeline; and the second acid leaching tank communicates with the neutralization tank, a liquid drain opening of the neutralization tank communicates with a chlorination rare earth product tank, and a discharge opening of the neutralization tank communicates with a thorium residue containing pond.

4. A method of using the mixed rare earth concentrate mineral and suspended mineral phase transformation-clean leaching system of claim 1, comprising the following steps:

Step 1, preparing:
generating negative pressure in the Venturi dryer, the first cyclone separator, the second cyclone separator, the suspension preheating decomposition furnace, and the third cyclone separator, introducing combustion flue gas into the Venturi dryer to remove adsorption water from mixed rare earth concentrate mineral powder and preheat the mixed rare earth concentrate mineral powder;

Step 2, drying and separating:
transporting the mixed rare earth concentrate mineral powder in the feed hopper into the Venturi dryer, after drying and dehydrating, sending the mixed rare earth concentrate mineral powder preheated to 150-200° C. into the first cyclone separator, and after cyclone separation, sending a bottom material into the suspension preheating decomposition furnace through the second cyclone separator;

Step 3, suspension preheating decomposition:
introducing flue gas through an air inlet in a bottom of the suspension preheating decomposition furnace for preheating the material entering the suspension preheating decomposition furnace to decompose the material into a suspension state, introducing enough coal gas into the suspension preheating decomposition furnace for burning, and maintaining the entire mineral phase transformation process to be performed in an oxygen free or low oxygen environment to achieve directional transformation of $CeCO_3F$ to $CeOF$ and prevent the generation of Ce (IV) so as to obtain the material after suspension preheating decomposition, and wherein a temperature of the material is controlled between 550-800° C. for 1-10 min;

Step 4, mineral phase transformation:
introducing the material after suspension preheating decomposition to the third cyclone separator, after cyclone separation, firstly introducing a bottom material to the first fluidization sealing valve, isolating oxygen and air, then introducing the material to the mineral phase transformation machine, introducing nitrogen gas into the mineral phase transformation machine as protection gas, maintaining the material to the suspension state and complete mineral phase transformation under an action of the protection gas, and controlling the temperature of the material to 450-650° C. for 1-2.5 hours, so as to obtain the material after mineral phase transformation;

Step 5, water cooling:
discharging products through the second fluidization sealing valve for the material after mineral phase transformation, then discharging the mineral phase transformation products into the water cooling tank through the fifth cyclone separator for water cooling, and finally, introducing the products after water cooling into the ball mill;

Step 6, cleaning leaching:
(1) after the material is ground into powder in the ball mill, wherein a grain size of the material is controlled to about 45 μm and a content to 85-95 wt %, and then discharging the material into the first acid leaching tank;
(2) performing hydrochloric acid leaching in the first acid leaching tank, wherein a concentration of hydrochloric acid is 8-13 mol/L, and a mass ratio of a REO in the mixed rare earth concentrate mineral powder to the hydrochloric acid is 1 to (1-3), a leaching temperature is 65-100° C., and a leaching time is 1-3 hours, and after acid leaching, introducing leached acid liquor obtained after pressure filtration into the second acid leaching tank;
(3) introducing acid leached residues into the alkali leaching tank for NaOH alkali decomposition, wherein a mass concentration of the NaOH is 50-80%, a mass ratio of a REO in the acid leached residues to the NaOH is 1 to (0.5-2.5), a temperature is 130-220° C., and a time is 1-2 hours, discharging alkali decomposed residues into the water washing tank for water washing, wherein a water washing temperature is between 55-100° C., and a final pH for water washing of 7-9;
(4) performing pressure filtration on the alkali decomposed residues after water washing, introducing filtrate into a washing liquor recovery tank, and introducing filter residues into the second acid leaching tank;

(5) mixing the filter residues with the introduced leached acid liquor in the second acid leaching tank, and then performing joint stirring and acid leaching at an acid leaching temperature of 40-80° C., wherein a mass ratio of the filter residues to the leached acid liquor is 1 to (5-10), and a time is 1-3 hours, so as to obtain a leached product; and (6) after introducing the leached product into the neutralization tank, adding the NaOH into the neutralization tank, performing continuous stirring and mixing, wherein a mass concentration of the NaOH is 15-35%, a stirring time is 1-2.5 hours, and a final pH is 4-5, after neutralization is completed, introducing neutralization liquor into a chlorination rare earth product tank, and introducing neutralization residues into a thorium residue containing pond.

5. The method of using the mixed rare earth concentrate mineral and suspended mineral phase transformation-clean leaching system of claim 4, wherein after the mixed rare earth concentrate mineral powder which is preheated to 150-200° C. is introduced into the first cyclone separator, a separated dust is introduced into the electric dust remover, the flue gas after dust removal is introduced into the tail gas absorption station to be purified, and then the purified flue gas is discharged from the chimney (32); and the dust collected by the electric dust remover returns to the third cyclone separator through the pneumatic lifting pump under an action of the ash returning fan.

6. The method of using the mixed rare earth concentrate mineral and suspended mineral phase transformation-clean leaching system of claim 4, wherein the flue gas introduced into the suspension preheating decomposition furnace is generated by mixed gas of air and reducing gas introduced in a main burner through burning, and the flue gas generated in a running process of the suspension preheating decomposition furnace returns to the Venturi dryer through the third cyclone separator and the second cyclone separator so as to realize waste heat utilization; the dust and the gas, separated by the fifth cyclone separator, return to the third cyclone separator; and the dust and the gas, separated by the sixth cyclone separator, return to the fifth cyclone separator, and redundant dust particles separated by the fifth cyclone separator enter the second ash hopper when passing through a pipeline.

7. The method of using the mixed rare earth concentrate mineral and suspended mineral phase transformation-clean leaching system of claim 4, further comprising classifying powder ground in the ball mill by a screw classifier, and returning sand to the ball mill to be reground.

* * * * *